US011900148B2

(12) United States Patent
Kumar et al.

(10) Patent No.: US 11,900,148 B2
(45) Date of Patent: Feb. 13, 2024

(54) TECHNOLOGIES FOR SCHEDULING TIME SENSITIVE CYCLICAL NETWORK TRAFFIC IN REAL-TIME

(71) Applicant: Intel Corporation, Santa Clara, CA (US)

(72) Inventors: Anil Kumar, Chandler, AZ (US); Subba Mungara, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 325 days.

(21) Appl. No.: 16/951,655

(22) Filed: Nov. 18, 2020

(65) Prior Publication Data
US 2021/0144122 A1 May 13, 2021

Related U.S. Application Data

(63) Continuation of application No. 15/721,094, filed on Sep. 29, 2017, now Pat. No. 10,848,459.

(51) Int. Cl.
*G06F 9/48* (2006.01)
*H04W 72/121* (2023.01)
(Continued)

(52) U.S. Cl.
CPC ............... *G06F 9/48* (2013.01); *G06F 9/445* (2013.01); *H04L 47/60* (2013.01); *H04W 72/121* (2013.01); *H04L 2101/622* (2022.05)

(58) Field of Classification Search
CPC .......... G06F 9/48; G06F 9/445; G06F 9/4887; H04L 47/60; H04L 2101/622; H04L 61/6022; H04W 72/121
See application file for complete search history.

(56) References Cited

U.S. PATENT DOCUMENTS 6,650,640 B1 * 11/2003 Muller ............... H04L 49/9063
370/473
10,601,713 B1 * 3/2020 Turgeman ............... H04L 47/62
(Continued)

OTHER PUBLICATIONS

United States Patent and Trademark Office, "Non-Final Office Action," issued in connection with U.S. Appl. No. 15/721,094, dated Mar. 6, 2019, 12 pages.
(Continued)

*Primary Examiner* — Mohammad S Adhami
*Assistant Examiner* — Raul Rivas
(74) *Attorney, Agent, or Firm* — Hanley, Flight & Zimmerman, LLC

(57) ABSTRACT

Technologies for scheduling time-sensitive cyclical network traffic in real-time include an internet-of-things (IoT) device that includes at least one sensor for collecting sensor data. The IoT device is configured to store the collected sensor data in a data buffer, allocate a packet descriptor for the sensor data, and populate the allocated packet descriptor with a cyclic data port pointer indicative of a location of the data buffer. The IoT device is additionally configured to queue the packet descriptor into a media access control (MAC) unit transmit direct memory access (DMA) of the IoT device, fetch the sensor data, and packetize the fetched data to form a network packet. Further, the IoT device is configured to transmit the network packet to a target computing device based on a launch time, update the launch time, and requeue the packet descriptor into the MAC unit transmit DMA. Other embodiments are described herein.

22 Claims, 9 Drawing Sheets

(51) Int. Cl.
G06F 9/445 (2018.01)
H04L 47/60 (2022.01)
H04L 101/622 (2022.01)

(56) References Cited

U.S. PATENT DOCUMENTS

| | | | |
|---|---|---|---|
| 10,848,459 B2 | 11/2020 | Kumar et al. | |
| 2013/0079048 A1* | 3/2013 | Cai | H04W 36/0061 |
| | | | 455/517 |
| 2013/0117766 A1 | 5/2013 | Bax et al. | |
| 2014/0330991 A1* | 11/2014 | Harper | H04L 47/621 |
| | | | 710/18 |
| 2016/0212057 A1* | 7/2016 | Hahm | H04B 17/364 |
| 2016/0266954 A1* | 9/2016 | Paulraj | G06F 11/0709 |
| 2016/0309364 A1* | 10/2016 | Maheshwari | H03M 7/30 |
| 2016/0337258 A1 | 11/2016 | Attar et al. | |
| 2017/0235614 A1* | 8/2017 | Choe | G06F 9/5016 |
| | | | 718/104 |
| 2017/0251471 A1* | 8/2017 | Jeong | H04W 52/0216 |
| 2019/0180493 A1* | 6/2019 | Tong | A63B 69/00 |

OTHER PUBLICATIONS

United States Patent and Trademark Office, " Final Office Action," issued in connection with U.S. Appl. No. 15/721,094, dated Jun. 27, 2019, 13 pages.

United States Patent and Trademark Office, "Non-Final Office Action," issued in connection with U.S. Appl. No. 15/721,094, dated Jan. 10, 2020, 12 pages.

United States Patent and Trademark Office, "Notice of Allowance and Fee(s) Due," issued in connection with U.S. Appl. No. 15/721,094, dated Jul. 24, 2020, 7 pages.

* cited by examiner

TECHNOLOGIES FOR SCHEDULING TIME SENSITIVE CYCLICAL NETWORK TRAFFIC IN REAL-TIME

CROSS-REFERENCE TO RELATED APPLICATIONS

This patent arises from a continuation U.S. patent application Ser. No. 15/721,094 (now U.S. Pat. No. 10,848,459), filed on Sep. 29, 2017, and which is hereby incorporated herein by reference in its entirety for all purposes. Priority to U.S. patent application Ser. No. 15/721,094 is claimed.

BACKGROUND

In packet-switched network architectures, data is transmitted in the form of network packets between computing devices. At a high level, data is collected and packetized into a network packet, which is then sent to a scheduler of a network interface controller (NIC) responsible for dispatching the network packet to a target computing device via a network. Typically, such operations are performed by software; however, performing these time-critical operations in software generally calls for tight designing, refinement, and tuning, which may not always be possible under certain conditions and/or in certain environments. In certain applications, such as motion control for automation in discrete manufacturing or vehicular automation, for example, short cycle times and guaranteed data delivery is necessary to perform certain operations.

Presently, each time a given data set needs to be transmitted, a new packet buffer is allocated and a network driver copies data from a data port (e.g., mapped to a fixed location in memory) into the newly allocated packet buffer. To guarantee latency in packet transmission times, present technologies generally tag each packet buffer with a launch time hint. Accordingly, this launch time hint for the packet buffer is used by a packet scheduler to begin the transmission at that prescribed launch time. However, such an approach, due to packet buffer allocation and setup times in software for each packet, can add latency and jitter to the packet transmission time and may not deliver certain packets in time, thereby impeding the efficiency of latency sensitive operations.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
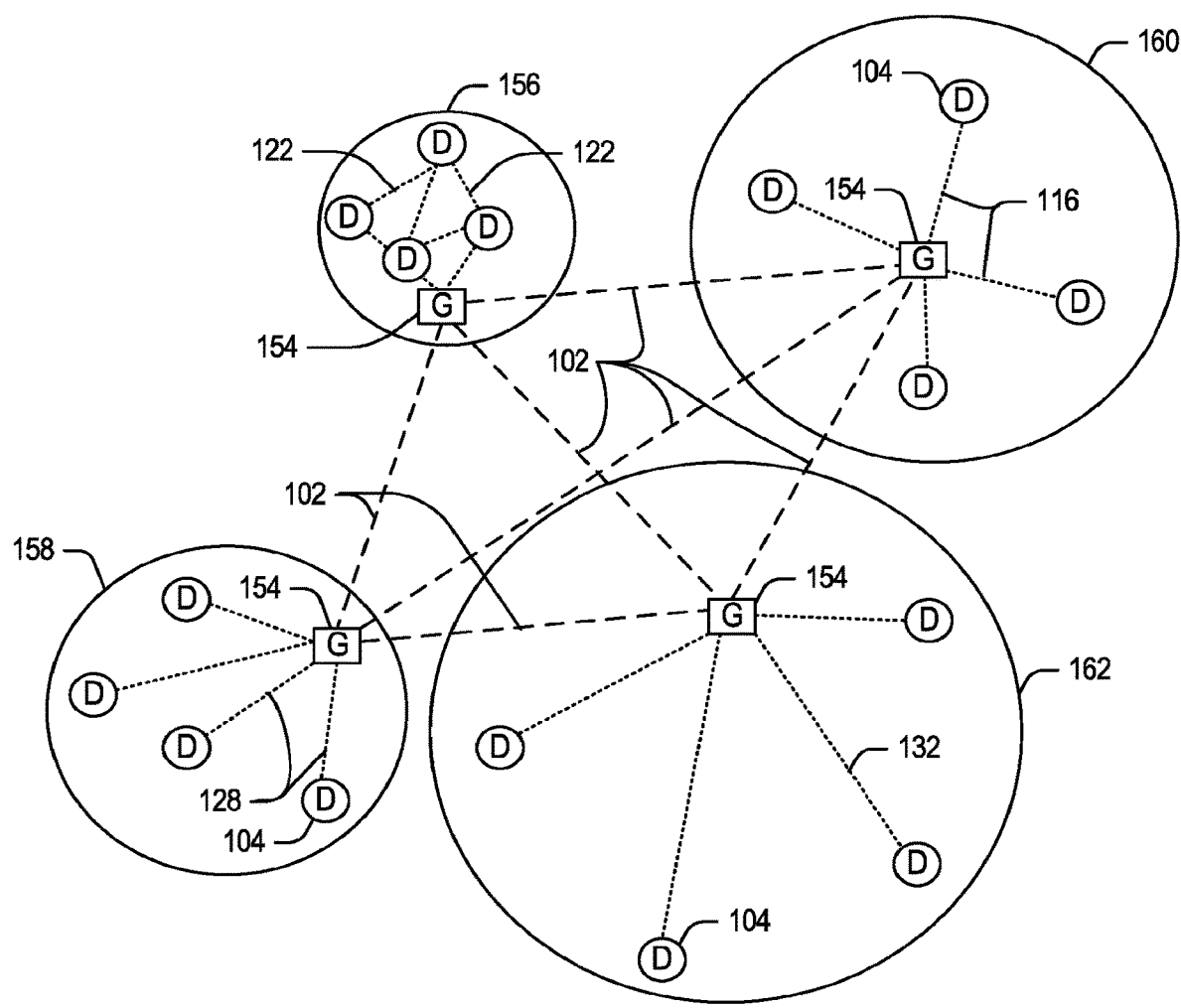
FIG. 1 illustrates an domain topology for respective internet-of-things (IoT) networks coupled through links to respective gateways, according to an example.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures.

Additionally, the inclusion of a structural or method feature in a particular figure is not meant to imply that such feature is required in all embodiments and, in some embodiments, may not be included or may be combined with other features.

FIG. 1 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
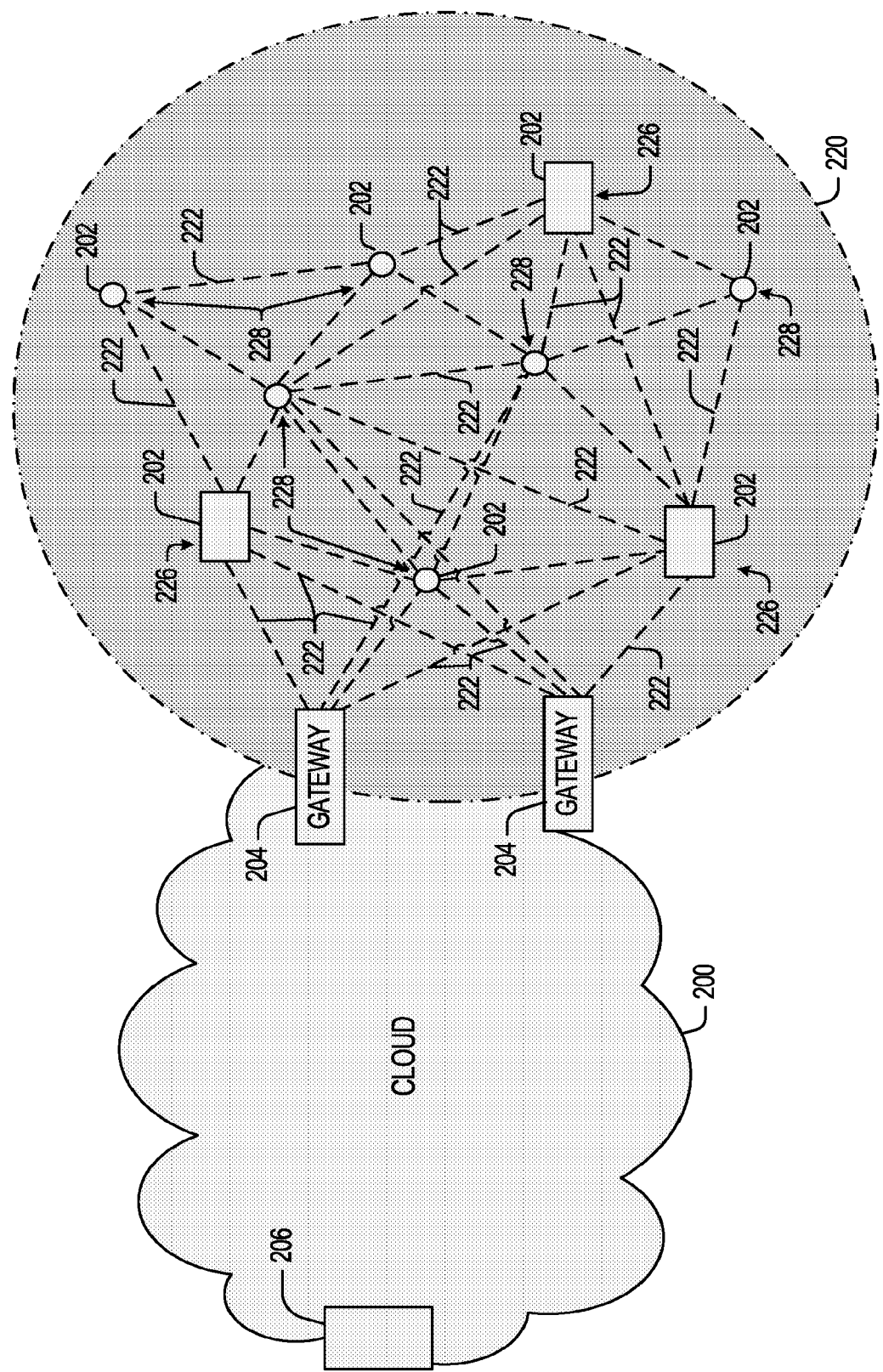
FIG. 2 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 7 and 8.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 2 below.

FIG. 2 illustrates a cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 3:
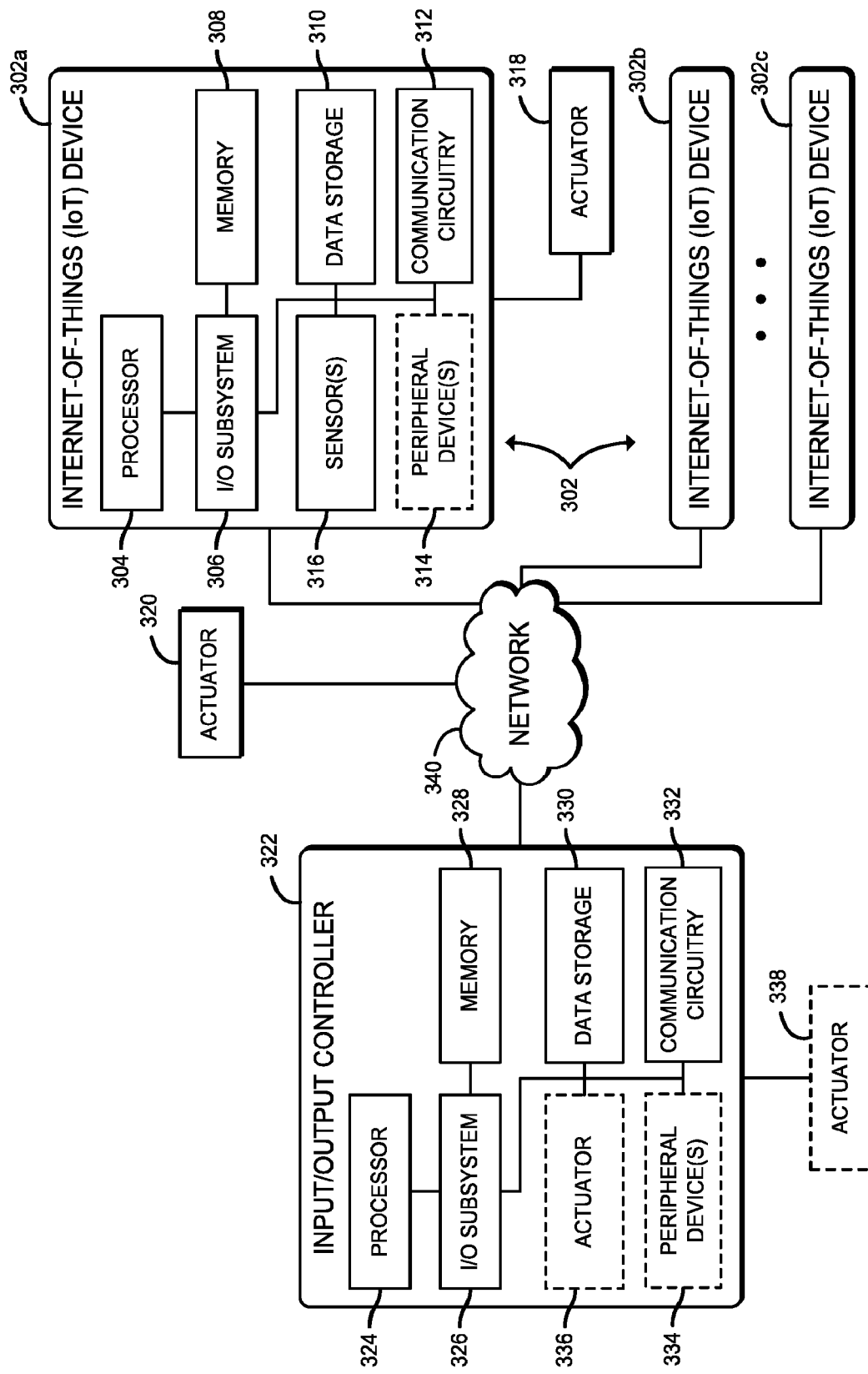
FIG. 3 is a simplified block diagram of at least one embodiment of a system for scheduling time-sensitive cyclical network traffic in real-time that includes at least one internet-of-things (IoT) device coupled to an input/output (I/O) controller via a network.

Referring now to FIG. 3, in an illustrative embodiment, a system 300 for scheduling time-sensitive cyclical network traffic in real-time includes an input/output (I/O) controller 322 in communication with one or more internet-of-things (IoT) devices 302 via a network 340. In use, a sensor of an IoT device 302 (e.g., a sensor 316 of the illustrative IoT device 302a) collects data that the IoT device 302 can package and transmit to the I/O controller 322. Upon receipt of the data from the IoT device 302, the I/O controller 322 can determine whether or not to take a particular action as a function of the received data. However, unlike existing techniques (see, e.g., the method 500 of FIG. 5) in which a data port is mapped to a fixed memory location and the exchange of data is performed through the cyclic process of reading the data from the same location, packetizing the data, and submitting the packetized data to a packet scheduler, the IoT device 302 as described herein is configured to packetize and schedule periodic data to be transmitted on-time, without tuning of the task scheduling in real-time.

To do so, as described in further detail below, the IoT device 302 is configured to perform a one-time allocation of a memory buffer usable to store and transmit periodic data therefrom via a given port of the IoT device 302. Additionally, the IoT device 302 is configured to synthesize a network packet in hardware direct memory access (DMA) with a gather list of memory buffers (i.e., with one of the memory buffers being the memory mapped port that generates cyclic data), as well as reuse the memory buffer and queue the memory buffer into a network interface queue periodically using either software (e.g., via an interrupt service routine (ISR)) or automatically via hardware. Accordingly, the cyclic data exchange between the IoT devices 302 and the IoT controller 322, which is typically critical and frequent, can be supported in real-time, or in very near real-time.

Each of the IoT devices 302 may be embodied as any type of computation or computer device capable of performing the functions described herein, including, without limitation, an embedded computing device, an IoT gateway, a sensor, a manufactured part, a manufactured assembly, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 3, the IoT device 302 illustratively includes a processor 304, an input/output subsystem 306, a memory 308, a data storage device 310, communication circuitry 312, one or more sensors 316, and in some embodiments, one or more peripheral devices 314. Of course, one or more of the IoT devices 302 may include other or additional components, such as those commonly found in an embedded computer (e.g., various input/output devices), in other embodiments. Additionally, in some embodiments, one or more of the illustrative components may be incorporated in, or otherwise form a portion of, another component. For example, the memory 308, or portions thereof, may be incorporated in the processor 304 in some embodiments.

The processor 304 may be embodied as any type of processor capable of performing the functions described herein. The processor 304 may be embodied as a single-core or multi-core processor(s), digital signal processor, field programmable gate array (FPGA), microcontroller, or other processor or processing/controlling circuit. It should be appreciated that, in some embodiments, the IoT device 302 may include more than one processor 304, such as in a multi-processor architecture. The memory 308 may be embodied as any type of volatile or non-volatile memory or data storage capable of performing the functions described herein. In operation, the memory 308 may store various data and software used during operation of the IoT device 302 such as operating systems, applications, programs, libraries, and drivers.

The memory 308 is communicatively coupled to the processor 304 via the I/O subsystem 306, which may be embodied as circuitry and/or components to facilitate I/O operations with the processor 304, the memory 308, and other components of the IoT device 302. For example, the I/O subsystem 306 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 306 may form a portion of a system-on-a-chip (SoC) and be incorporated, along with the processor 304, the memory 308, and other components of the IoT device 302, on a single integrated circuit chip.

The data storage device 310 may be embodied as any type of device or devices configured for short-term or long-term storage of data such as, for example, memory devices and circuits, memory cards, hard disk drives, solid-state drives, or other data storage devices. It should be appreciated that the data storage device 310 and/or the memory 308 (e.g., the computer-readable storage media) may store various data as described herein, including operating systems, applications, programs, libraries, drivers, instructions, etc., capable of being executed by a processor (e.g., the processor 304) of the IoT device 302.

The communication circuitry 312 may be embodied as any communication circuit, device, or collection thereof, capable of enabling communications between the IoT device 302 and other computing devices, such as another IoT device 302, as well as any network communication enabling devices, such as an access point, network switch/router, etc., to allow communication over a network (e.g., the network 340). The communication circuitry 312 may be configured to use any one or more communication technologies (e.g., wireless or wired communication technologies) and associated protocols (e.g., Ethernet, Bluetooth®, ZigBee®, Z-Wave®, Wi-Fi®, WiMAX, LTE, 5G, etc.) to effect such communication. As discussed above in regard to FIG. 5, those technologies may be used to establish a mesh network between the example communication circuitry 312 and other devices, as well as external networks.

It should be appreciated that, in some embodiments, the communication circuitry 312 may include specialized circuitry, hardware, or combination thereof to perform pipeline logic (e.g., hardware algorithms) for performing the functions described herein, including processing network packets (e.g., parse received network packets, determine destination computing devices for each received network packets, forward the network packets to a particular buffer queue of a respective host buffer of the IoT device 302, etc.), perform computational functions, etc. In some embodiments, the communication circuitry 312 may be embodied as a system-on-a-chip (SoC) or otherwise form a portion of a SoC of the IoT device 302 (e.g., incorporated on a single integrated circuit chip along with the processor 304, the memory 328, and/or other components of the IoT device 302). Alternatively, in some embodiments, the specialized circuitry, hardware, or combination thereof may be embodied as one or more discrete processing units of the IoT device 302, each of which may be capable of performing one or more of the functions described herein.

The peripheral device(s) 314 may include any type of device that is usable to input information into the IoT device 302 and/or receive information from the IoT device 302. The peripheral devices 314 may be embodied as any auxiliary device usable to input information into the IoT device 302, such as a keyboard, a mouse, a microphone, a barcode reader, an image scanner, etc., or output information from the IoT device 302, such as a display, a speaker, graphics circuitry, a printer, a projector, etc. It should be appreciated that, in some embodiments, one or more of the peripheral devices 314 may function as both an input device and an output device (e.g., a touchscreen display, a digitizer on top of a display screen, etc.). It should be further appreciated that the types of peripheral devices 314 connected to the IoT device 302 may depend on, for example, the type and/or intended use of the IoT device 302. Additionally or alternatively, in some embodiments, the peripheral devices 314 may include one or more ports, such as a USB port, for example, for connecting external peripheral devices to the IoT device 302.

For example, the one or more sensors 316 may be embodied as, but not limited to, one or more of a motion sensor, an image sensor, a position sensor, a temperature sensor, a humidity sensor, a power sensor, an environmental sensor, a building management sensor, a building automation sensor, a radar sensor, a vision sensor, or any other type of sensor. Accordingly, the IoT device 302 is configured to collect raw data from the sensor(s) 316 based on the type of sensor(s) of the IoT device 302, as well as any applicable data collection parameters. The IoT device 302 may also be configured to program or otherwise provide the sensor 316 with device settings or other command data.

In some embodiments, as illustratively shown with the IoT device 302a, the IoT device 302 may be coupled to an actuator 318 (e.g., over a short-range communication link). In other embodiments, an actuator may be physically incorporated in the IoT device 302, or as shown in the illustrative system 300, an actuator may be connected to the IoT device 302 over a network (see, e.g., the actuator 320 connected via the network 340). For example, one or more actuators of the system 300 (e.g., actuator 318, actuator 320, actuator 336, and actuator 338) may be embodied as a hydraulic actuator, a pneumatic actuator, an electrical actuator, a thermal actuator, a magnetic actuator, a mechanical actuator, or any other type of actuator. In some embodiments, the actuator may be embodied as an actuator end node that includes the actuator coupled internally with a microcontroller. For example, as illustratively shown, an actuator 336 may be physically incorporated in the I/O controller 322 in some embodiments. Additionally or alternatively, in some embodiments, an actuator 338 may be connected to the I/O controller 322 via a short-range communication link. In still other embodiments, an actuator may be coupled to the I/O controller 322 over a network (see, e.g., the actuator 320 connected via the network 340).

The I/O controller 322 may be embodied as any type of computation or computer device capable of performing the functions described herein, including, without limitation, a computer (e.g., a desktop computer, a smartphone, a tablet computer, a laptop computer, a notebook computer), a multiprocessor system, a server (e.g., stand-alone, rack-mounted, blade, etc.), a network appliance, a distributed computing system, a processor-based system, and/or a consumer electronic device (e.g., a wearable computing device). The illustrative I/O controller 322 includes an I/O controller 322 may include a processor 324, an I/O subsystem 326, a memory 328, a data storage device 330, communication circuitry 332, and, in some embodiments, one or more peripheral devices 334 and/or an actuator 336, and/or other components and devices commonly found in a server or similar computing device.

Those individual components of the I/O controller 322 may be similar to the corresponding components of the illustrative IoT device 302 (i.e., the IoT device 302a). As such, further descriptions of the like components are not repeated herein for clarity of the description with the understanding that the description of the corresponding components provided above in regard to the IoT device 302 applies equally to the corresponding components of the I/O controller 322. Of course, it should be appreciated that the I/O controller 322 may include additional and/or alternative components, depending on the embodiment. Additionally, in some embodiments, one or more of the illustrative components may be incorporated in, or otherwise form a portion of, another component.

In some embodiments, the I/O controller 322 may be embodied as a single computing device or a collection of computing devices (e.g., a server and associated devices). For example, in some embodiments, the I/O controller 322 may be embodied as a "virtual" computing device, formed from multiple computing devices distributed across the network 340, such as may operate in a public or private cloud. Accordingly, although the I/O controller 322 is illustrated in FIG. 3 and described below as being embodied as a single computing device, it should be appreciated that, in some embodiments, the I/O controller 322 may be embodied as multiple devices cooperating together to facilitate the functionality described below.

As noted previously, the IoT devices 302 and the I/O controller 322 may be configured to transmit and receive data with each other and/or other devices of the system 300 over the network 340. The network 340 may be embodied as any number of various wired and/or wireless networks. For example, the network 340 may be embodied as, or otherwise include, a wired or wireless local area network (LAN), a wired or wireless wide area network (WAN), a low power wide area network (LPWAN) such as LoRaWAN™, SIGFOX, etc., a controller-area network, a cellular network, and/or a publicly-accessible, global network such as the Internet. As such, the network 340 may include any number of additional devices, such as additional compute and/or storage devices, access points, routers, switches, and hubs as may be necessary to facilitate the transmission of communications across the network 340.

Figure 4:
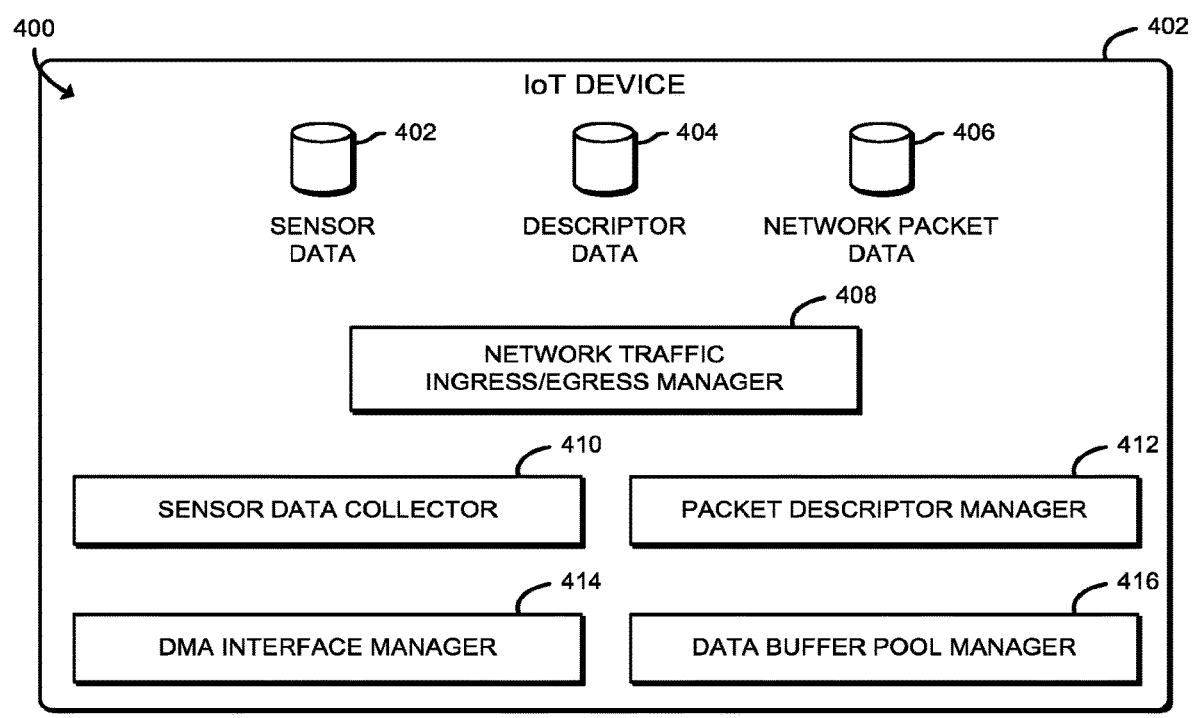
FIG. 4 is a simplified block diagram of at least one embodiment of an environment of at least one of the IoT devices of the system of FIG. 3.

Referring now to FIG. 4, in use, the IoT device 302 establishes an environment 400 during operation. The illustrative environment 400 includes a network traffic ingress/egress manager 408, a sensor data collector 410, a packet descriptor manager 412, a direct memory access (DMA)

interface manager 414, and a data buffer pool manager 416. The various components of the environment 400 may be embodied as hardware, firmware, software, or a combination thereof. As such, in some embodiments, one or more of the components of the environment 400 may be embodied as circuitry or collection of electrical devices (e.g., network traffic ingress/egress manager circuitry 408, sensor data collection circuitry 410, packet descriptor management circuitry 412, a DMA interface management circuitry 414, a data buffer pool management circuitry 416, etc.).

It should be appreciated that, in some embodiments, one or more of the illustrative components may form a portion of another component and/or one or more of the illustrative components may be independent of one another. Further, in some embodiments, one or more of the components of the environment 400 may be embodied as virtualized hardware components or emulated architecture, which may be established and maintained by the processor 304, the communication circuitry 312, the sensor(s) 316, or other component(s) of the IoT device 302. It should be appreciated that the IoT device 302 may include other components, sub-components, modules, sub-modules, logic, sub-logic, and/or devices commonly found in a sensor enabled computing device, which are not illustrated in FIG. 4 for clarity of the description.

In the illustrative environment 400, the IoT device 302 additionally includes sensor data 402, descriptor data 404, and network packet data 406, each of which may be accessed by the various components and/or sub-components of the IoT device 302. Further, each of the sensor data 402, the descriptor data 404, and the network packet data 406 may be accessed by the various components of the IoT device 302. Additionally, it should be appreciated that in some embodiments the data stored in, or otherwise represented by, each of the sensor data 402, the descriptor data 404, and the network packet data 406 may not be mutually exclusive relative to each other. For example, in some implementations, data stored in the sensor data 402 may also be stored as a portion of one or more of the descriptor data 404 and/or the network packet data 406. As such, although the various data utilized by the IoT device 302 is described herein as particular discrete data, such data may be combined, aggregated, and/or otherwise form portions of a single or multiple data sets, including duplicative copies, in other embodiments.

The network traffic ingress/egress manager 408, which may be embodied as hardware, firmware, software, virtualized hardware, emulated architecture, and/or a combination thereof as discussed above, is configured to receive inbound and route/transmit outbound network traffic. Accordingly, the network traffic ingress/egress manager 408 is configured to facilitate the receipt of inbound network communications (e.g., network traffic, network packets, network flows, etc.) to the IoT device 302 by managing (e.g., create, modify, delete, etc.) connections to physical and virtual network ports (i.e., virtual network interfaces) of the IoT device 302 (e.g., via the communication circuitry 312), as well as the ingress buffers/queues associated therewith.

Additionally, the network traffic ingress/egress manager 408 is configured to facilitate the transmission of outbound network communications (e.g., network traffic, network packet streams, network flows, etc.) from the IoT device 302 by managing (e.g., create, modify, delete, etc.) connections to physical and virtual network ports/interfaces of the IoT device 302 (e.g., via the communication circuitry 312), as well as the egress buffers/queues associated therewith. Further, the network traffic ingress/egress manager 408 is configured to packetize or otherwise construct/add the appropriate headers at the applicable layers to the network packet, the payload (e.g., the data segment collected by the sensor(s) 316), and any footers, such as may be used to store error-detecting code (e.g., cyclic redundancy check (CRC) data verification information). In some embodiments, the network traffic ingress/egress manager 408 is configured to allocate a packet scatter buffer for a header field and a tail field (i.e., of a to-be-generated network packet).

The sensor data collector 410, which may be embodied as hardware, firmware, software, virtualized hardware, emulated architecture, and/or a combination thereof as discussed above, is configured to collect the data detected/measured by a sensor (e.g., one of the sensor(s) 316) of the IoT device 302. It should be appreciated that the data collected by the sensor data collector depends on the type of sensor from which the data is being collected from. In some embodiments, the rate of collection and amount of data collected may be based upon one or more collection parameters, which may have been received by the I/O controller 322. Additionally, in some embodiments, the collected data may be stored in the sensor data 402.

The packet descriptor manager 412, which may be embodied as hardware, firmware, software, virtualized hardware, emulated architecture, and/or a combination thereof as discussed above, is configured to match information associated with a network packet to a descriptor (i.e., an address mapping descriptor) which is mapped to a memory location (i.e., an address of a memory buffer) usable to write the payload data of the network packet to, as well as any other information associated with the network packet (e.g., header fields, tail fields, etc.). In some embodiments, the packet descriptor information may be provided by a processor (e.g., the processor 304) of the IoT device 302. Additionally or alternatively, in some embodiments, information usable to populate the packet descriptor information may be received from the I/O controller 322.

For example, the packet descriptor manager 412 may be configured to identify information associated with a source of the network packet (e.g., the type of sensor, the location of the sensor, etc.), or a portion of the network packet (e.g., a header, the payload, etc.), or otherwise identify information associated with the network packet which is usable to allocated and populate a packet descriptor (e.g., based on descriptor mapping information). Such information may include metadata stored in a header of the network packet, a payload type (e.g., based on the type of sensor associated with the data/payload) of the network packet, a flow associated with the network packet, etc. Accordingly, the descriptor manager 412 may be additionally configured to manage (e.g., store, update, remove, etc.) the packet descriptors and/or other information associated therewith. In such embodiments, the descriptor manager 412 may be configured to store such descriptor population data, allocation data, and/or address mapping information in the descriptor data 404.

In some embodiments, the descriptor manager 412 may be configured to manage the packet descriptors in a transmission descriptor ring. In such embodiments, the descriptor manager 412 may be configured to manage pointers to network packets available for transmission and the list of associated memory buffers. Additionally, in some embodiments, the descriptor manager 412 may be configured to manage a transmission descriptor ring which is shared across more than one transmit DMA channel.

The DMA interface manager 414, which may be embodied as hardware, firmware, software, virtualized hardware, emulated architecture, and/or a combination thereof as discussed above, is configured to provide an interface to a shared media access control (MAC) unit transmit DMA. To do so, the DMA interface manager 414 is configured to receive a packet descriptor and read data (e.g., sensor data) associated with a network packet from main memory based on the received packet descriptor, and return the read data. The DMA interface manager 414 is additionally configured to return the data to the requestor, which is usable to incorporate into a network packet for transmission. In some embodiments, the MAC unit may be associated with a particular network port of the communication circuitry (e.g., the communication circuitry 312).

The data buffer pool manager 416, which may be embodied as hardware, firmware, software, virtualized hardware, emulated architecture, and/or a combination thereof as discussed above, is configured to fetch sensor data to be transmitted from a data buffer pool. To do so, in some embodiments, the data buffer pool manager 416 may be configured to fetch the data based on a cyclic data port pointer, which is usable to identify a location in memory from which to fetch the sensor data. In other words, the cyclic data port pointer indicates a location in memory (e.g., a cache buffer, a memory buffer, etc.) from which to fetch the sensor data. To do so, the data buffer pool manager 416 may be configured to request a packet descriptor (e.g., via the descriptor manager 412) for a DMA channel and then request to read the network packet(s) from main memory (e.g., via the DMA interface manager 414). Such fetched data may then be packetized and transmitted (e.g., by the network traffic ingress/egress manager 408) to an I/O controller (e.g., the I/O controller 322) or some other management/controller/monitoring device.

Figure 5:
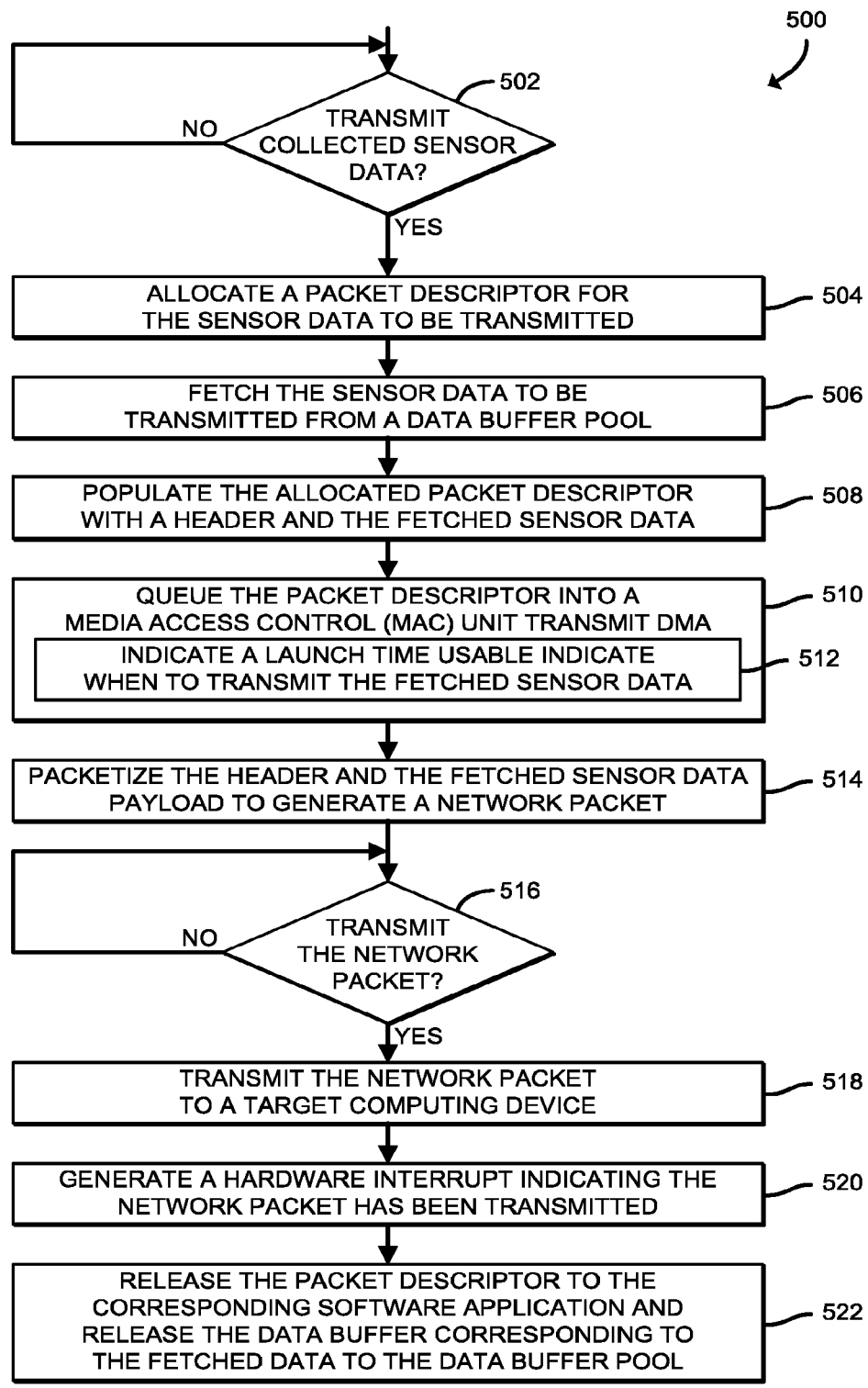
FIG. 5 is a simplified flow diagram of at least one embodiment of a typical method for dispatching network packets from an IoT device to an I/O controller in a cyclical routine.

Referring now to FIG. 5, a typical method 500 for dispatching network packets from an IoT device to an I/O controller in a cyclical routine is shown which may be executed by an IoT device (e.g., the IoT device 302 of FIG. 3). The typical method 500 begins in block 502, in which the IoT device determines whether to transmit at least a portion of collected sensor data, such as may be based on an elapsed amount of time, an amount of collected sensor data, etc. If the IoT device determines that the collected sensor data is to be transmitted, the typical method 500 advances to block 504, in which the IoT device allocates a packet descriptor for the sensor data to be transmitted. In block 506, the IoT device fetches the sensor data from a data buffer pool. In block 508, the IoT device populates the allocated packet descriptor with a header and the fetched sensor data. In block 510, the IoT device queues the packet descriptor into a MAC unit transmit DMA. Additionally, in block 512, the IoT device indicates a launch time usable to indicate when to transmit the fetched sensor data.

In block 514, the IoT device packetizes the header and the fetched sensor data into a payload of a generated network packet. In block 516, the IoT device determines whether to transmit the network packet, based on the previously indicated launch time. If the IoT device determines the network packet is to be transmitted in block 516, the typical method 500 advances to block 518. In block 518, the IoT device transmits the network packet to a target computing device. In block 520, the IoT device generated a hardware interrupt indicating the network packet has been transmitted. In block 522, the IoT device releases the packet descriptor to the corresponding software application and releases the data buffer corresponding to the fetched data to the data buffer pool.

It should be appreciated that the launch time for the buffered network packet is used by a network packet scheduler (not shown) of the IoT device to begin the transmission of the network packet at the launch time. However, due to packet buffer allocation and setup times in software for each network packet, such techniques typically add latency and jitter to the packet transmission time, which can result in certain network packets not being delivered on time. As such, certain operations associated with the applicable usage can become unsynchronized, especially in such use cases in which the delivery of network packets is latency sensitive.

Figure 6A:
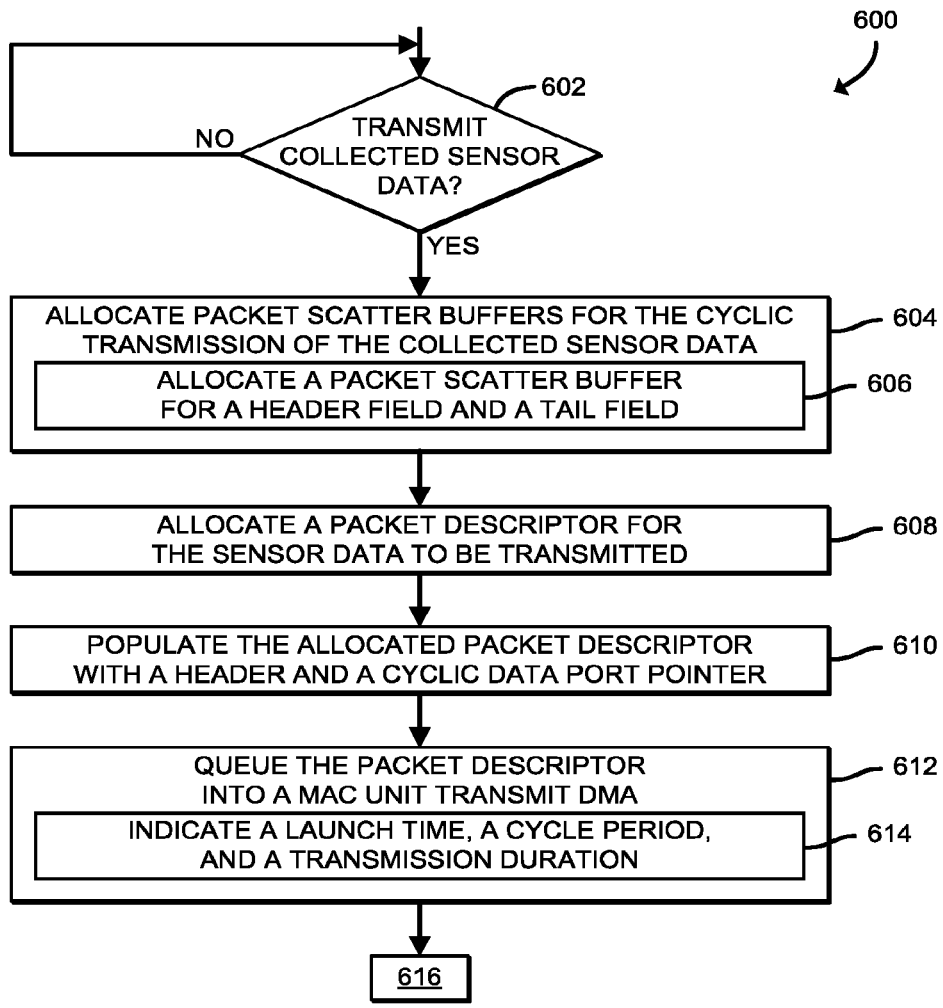
FIGS. 6A and 6B are a simplified flow diagram of at least one embodiment of a method for scheduling time-sensitive cyclical network traffic in real-time that may be executed by the IoT device of FIGS. 4 and 5.
Figure 6B:
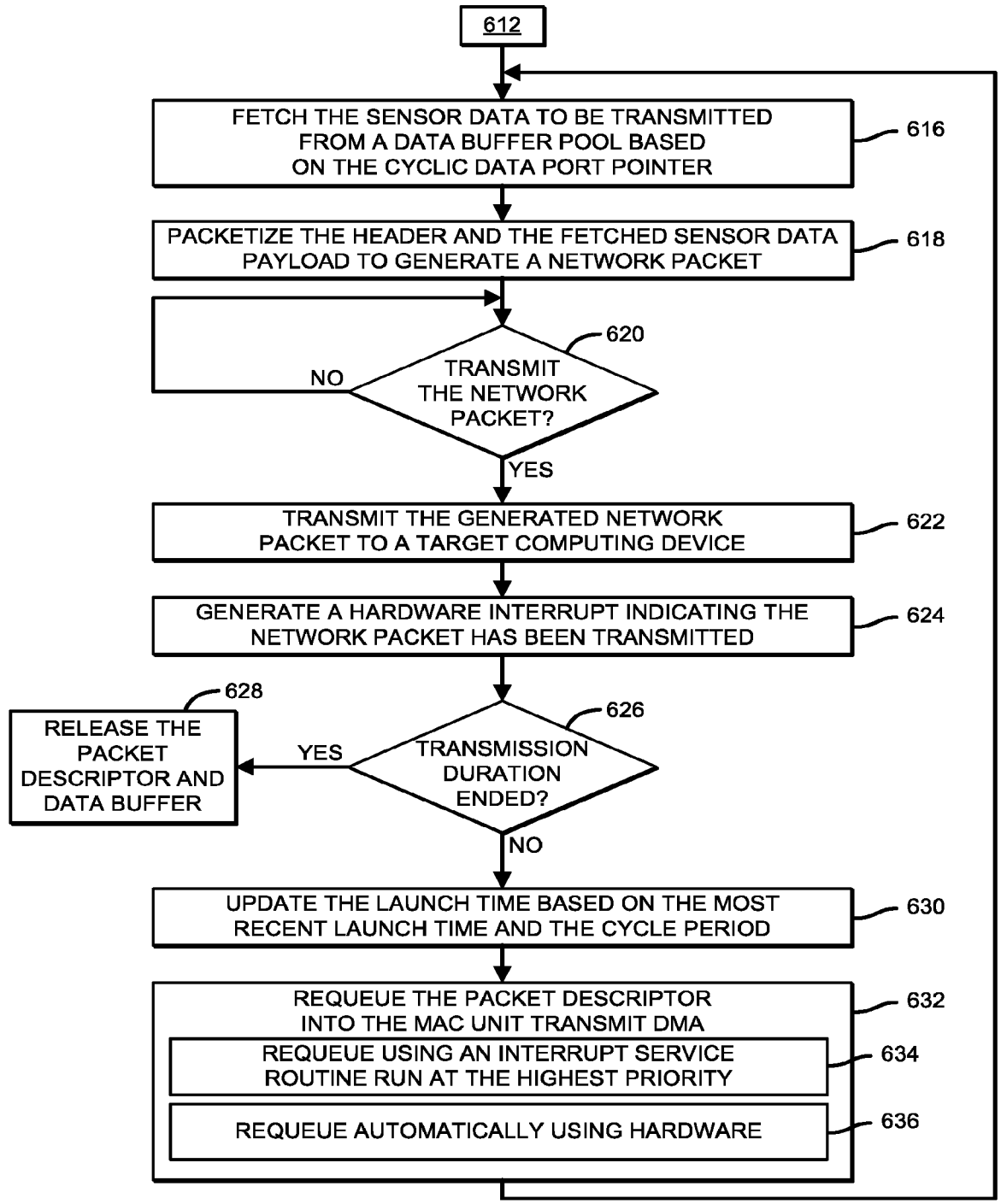

Referring now to FIGS. 6A and 6B, a method 600 for scheduling time-sensitive cyclical network traffic in real-time is shown which may be executed by an IoT device (e.g., the IoT device 302 of FIG. 3). The method 600 begins in block 602, in which the IoT device 302 determines whether to transmit at least a portion of collected sensor data, such as may be based on an elapsed amount of time, an amount of collected sensor data, etc. If the IoT device 302 determines that the collected sensor data is to be transmitted, the method 600 advances to block 604, in which the IoT device 302 allocates packet scatter buffers for the cyclic transmission of the collected sensor data. To do so, in block 606, the IoT device 302 allocates a packet scatter buffer for a header field and a tail field (i.e., of a to-be-generated network packet). In block 608, the IoT device 302 allocates a packet descriptor for the collected sensor data to be transmitted. In block 610, the IoT device 302 populates the allocated packet descriptor with a header and a cyclic data port pointer.

In block 612, the IoT device 302 queues the packet descriptor into a MAC unit transmit DMA. Additionally, in block 614, the IoT device 302 indicates a launch time usable to indicate when to transmit a network packet that includes the sensor data to be transmitted, a cycle period usable to indicate a duration of time which to periodically transmit the sensor data, and a transmission duration usable to indicate a duration of time over which to periodically transmit the sensor data. In block 616, the IoT device 302 fetches the sensor data to be transmitted from a data buffer pool based on the cyclic data port pointer. In block 618, the IoT device 302 packetizes the header and the fetched sensor data payload to generate a network packet. In block 620, the IoT device 302 determines whether to transmit the network packet based on the launch time. If so, the method 600 advances to block 622, in which the IoT device 302 transmits the generated network packet to a target computing device. In block 624, the IoT device 302 generates a hardware interrupt indicating the network packet has been transmitted.

In block 626, the IoT device 302 determines whether the transmission duration has ended. In other words, the IoT device 302 determines whether the amount of time for transmitting data has elapsed. If so, the method 600 branches to block 628, in which the IoT device 302 releases the packet descriptor to the corresponding software application and releases the data buffer corresponding to the fetched data to the data buffer pool. Otherwise, if the IoT device 302 determines the previously received periodic cycle associated with the sensor data has not ended, the method branches to block 630. In block 630, the IoT device 302 updates the launch time based on the most recent launch time and the cycle period.

In block 632, the IoT device 302 requeues the packet descriptor into the MAC unit transmit DMA before the method 600 returns to block 616 in which the IoT device 302 fetches additional sensor data from the data buffer pool, which is to be transmitted to the target computing device as a function of the updated launch time. To do so, in block 634, in some embodiments the IoT device 302 may requeue the packet descriptor using an interrupt service routine (ISR), which may be run at the highest priority. Alternatively, in block 636, in some embodiments the IoT device 302 may requeue the packet descriptor based on the programmed cycle time using hardware.

Accordingly, unlike previous techniques (see, e.g., the typical method 500 of FIG. 5), the IoT device 302 as described herein for scheduling time-sensitive cyclical network traffic in real-time is configured to only allocate the buffer needed to transmit periodic data from a given port a single time. Additionally, the IoT device 302 as described herein, provides a mechanism to synthesize a packet in hardware DMA with a gather list of buffers, in which one of the buffers corresponds to the memory mapped port that generates the cyclic data. Further, the IoT device 302, as described herein, reuses the allocated buffer and queues the buffer into the network interface queues periodically using either ISRs in software or automatically via hardware.

Figure 7:
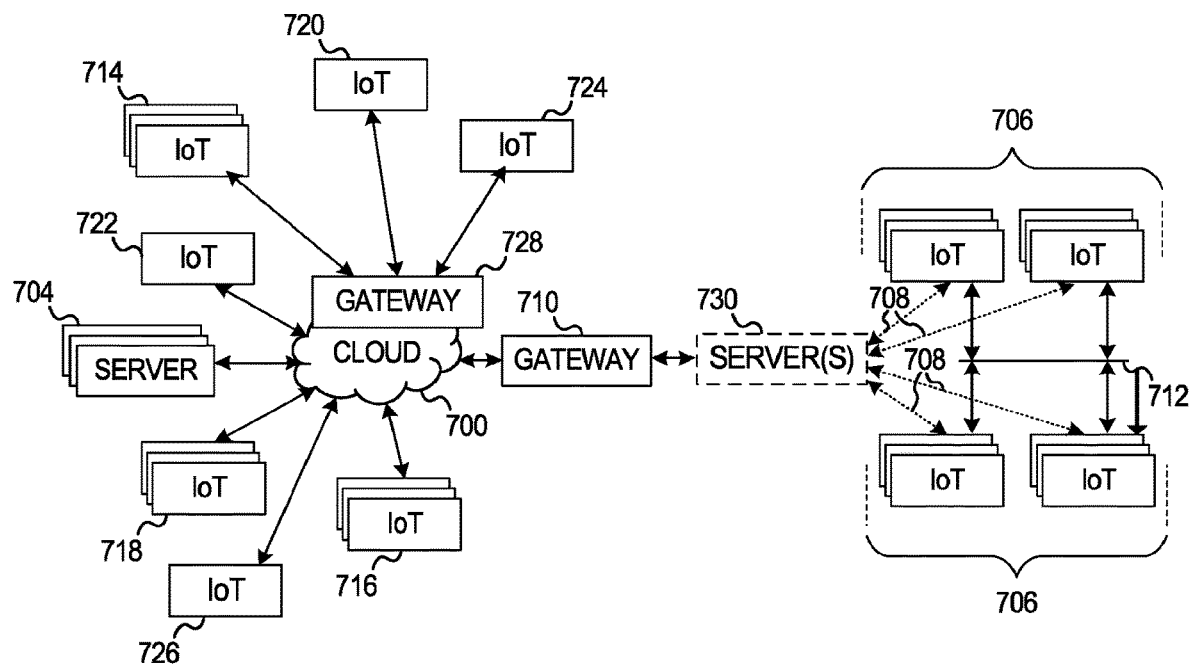
FIG. 7 illustrates a block diagram of a network illustrating communications among a number of IoT devices, according to an example.

FIG. 7 illustrates a drawing of a cloud computing network, or cloud 700, in communication with a number of Internet of Things (IoT) devices. The cloud 700 may represent the Internet, or may be a local area network (LAN), or a wide area network (WAN), such as a proprietary network for a company. The IoT devices may include any number of different types of devices, grouped in various combinations. For example, a traffic control group 706 may include IoT devices along streets in a city. These IoT devices may include stoplights, traffic flow monitors, cameras, weather sensors, and the like. The traffic control group 706, or other subgroups, may be in communication with the cloud 700 through wired or wireless links 708, such as LPWA links, optical links, and the like. Further, a wired or wireless sub-network 712 may allow the IoT devices to communicate with each other, such as through a local area network, a wireless local area network, and the like. The IoT devices may use another device, such as a gateway 810 or 828 to communicate with remote locations such as the cloud 800; the IoT devices may also use one or more servers 830 to facilitate communication with the cloud 800 or with the gateway 810. For example, the one or more servers 830 may operate as an intermediate network node to support a local edge cloud or fog implementation among a local area network. Further, the gateway 828 that is depicted may operate in a cloud-to-gateway-to-many edge devices configuration, such as with the various IoT devices 814, 820, 824 being constrained or dynamic to an assignment and use of resources in the cloud 800.

Other example groups of IoT devices may include remote weather stations 714, local information terminals 716, alarm systems 718, automated teller machines 720, alarm panels 722, or moving vehicles, such as emergency vehicles 724 or other vehicles 726, among many others. Each of these IoT devices may be in communication with other IoT devices, with servers 704, with another IoT fog device or system (not shown, but depicted in FIG. 2), or a combination therein. The groups of IoT devices may be deployed in various residential, commercial, and industrial settings (including in both private or public environments).

As can be seen from FIG. 7, a large number of IoT devices may be communicating through the cloud 700. This may allow different IoT devices to request or provide information to other devices autonomously. For example, a group of IoT devices (e.g., the traffic control group 706) may request a current weather forecast from a group of remote weather stations 714, which may provide the forecast without human intervention. Further, an emergency vehicle 724 may be alerted by an automated teller machine 720 that a burglary is in progress. As the emergency vehicle 724 proceeds towards the automated teller machine 720, it may access the traffic control group 706 to request clearance to the location, for example, by lights turning red to block cross traffic at an intersection in sufficient time for the emergency vehicle 724 to have unimpeded access to the intersection.

Clusters of IoT devices, such as the remote weather stations 714 or the traffic control group 706, may be equipped to communicate with other IoT devices as well as with the cloud 700. This may allow the IoT devices to form an ad-hoc network between the devices, allowing them to function as a single device, which may be termed a fog device or system (e.g., as described above with reference to FIG. 2).

Figure 8:
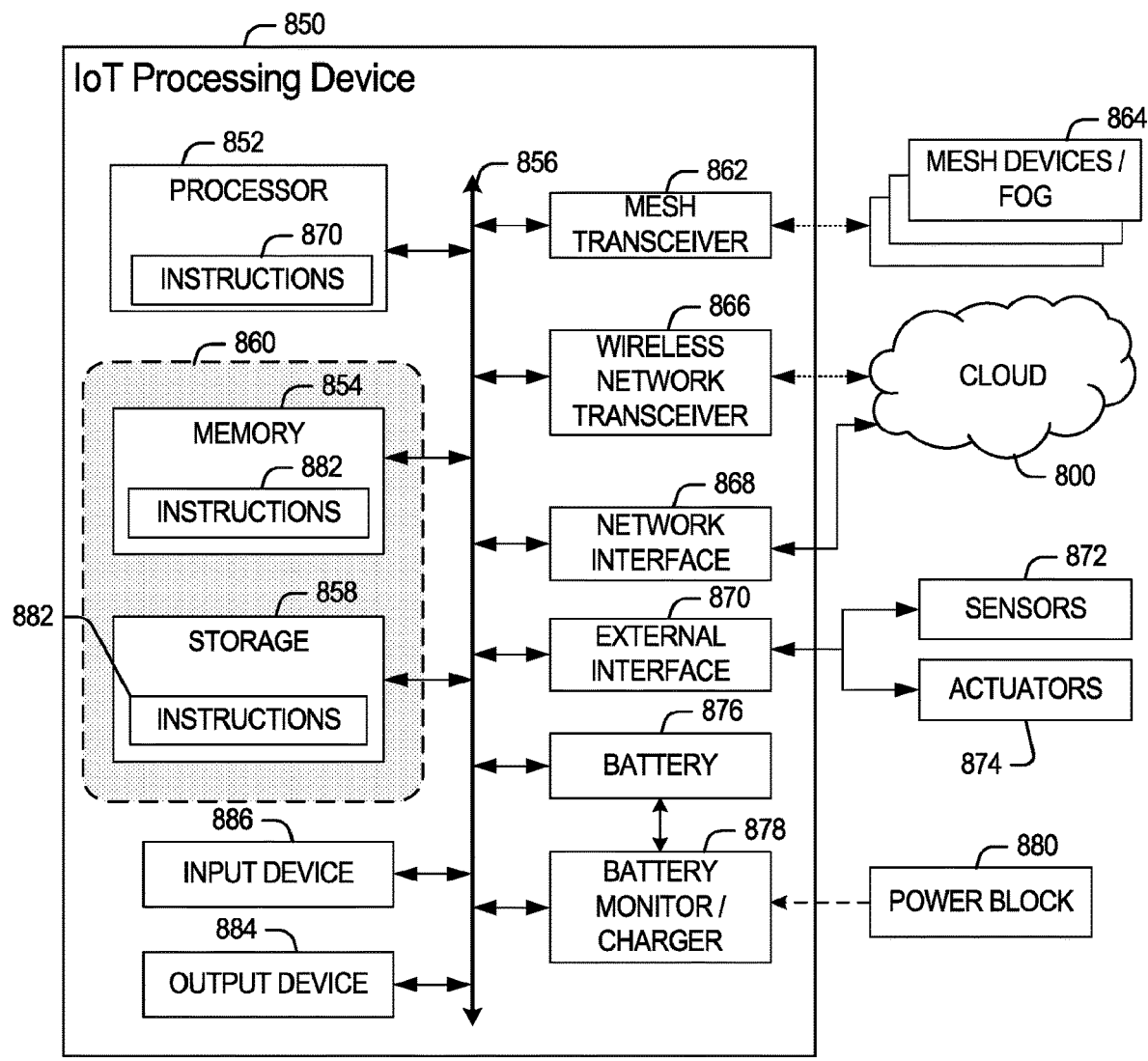
FIG. 8 illustrates a block diagram for an example IoT processing system architecture upon which any one or more of the techniques (e.g., operations, processes, methods, and methodologies) discussed herein may be performed, according to an example.

FIG. 8 is a block diagram of an example of components that may be present in an IoT device 850 for implementing the techniques described herein. The IoT device 850 may include any combinations of the components shown in the example or referenced in the disclosure above. The components may be implemented as ICs, portions thereof, discrete electronic devices, or other modules, logic, hardware, software, firmware, or a combination thereof adapted in the IoT device 850, or as components otherwise incorporated within a chassis of a larger system. Additionally, the block diagram of FIG. 8 is intended to depict a high-level view of components of the IoT device 850. However, some of the components shown may be omitted, additional components may be present, and different arrangement of the components shown may occur in other implementations.

The IoT device 850 may include a processor 852, which may be a microprocessor, a multi-core processor, a multi-threaded processor, an ultra-low voltage processor, an embedded processor, or other known processing element. The processor 852 may be a part of a system on a chip (SoC) in which the processor 852 and other components are formed into a single integrated circuit, or a single package, such as the Edison™ or Galileo™ SoC boards from Intel. As an example, the processor 852 may include an Intel® Architecture Core™ based processor, such as a Quark™, an Atom™, an i3, an i5, an i7, or an MCU-class processor, or another such processor available from Intel® Corporation, Santa Clara, California. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 852 may communicate with a system memory 854 over an interconnect 856 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 858 may also couple to the processor 852 via the interconnect 856. In an example the storage 858 may be implemented via a solid state disk drive (SSDD). Other devices that may be used for the storage 858 include flash memory cards, such as SD cards, microSD cards, xD picture cards, and the like, and USB flash drives. In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

The components may communicate over the interconnect 856. The interconnect 856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in a SoC based system. Other bus systems may be included, such as an I2C interface, an SPI interface, point to point interfaces, and a power bus, among others.

The interconnect 856 may couple the processor 852 to a mesh transceiver 862, for communications with other mesh devices 864. The mesh transceiver 862 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 864. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 862 may communicate using multiple standards or radios for communications at different range. For example, the IoT device 850 may communicate with close devices, e.g., within about 10 meters, using a local transceiver based on BLE, or another low power radio, to save power. More distant mesh devices 864, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 866 may be included to communicate with devices or services in the cloud 800 via local or wide area network protocols. The wireless network transceiver 866 may be a LPWA transceiver that follows the IEEE 802.15.4, or IEEE 802.15.4g standards, among others. The IoT device 850 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as timeslotted channel hopping, described in the IEEE 802.15.4e specification may be used.

Any number of other radio communications and protocols may be used in addition to the systems mentioned for the mesh transceiver 862 and wireless network transceiver 866, as described herein. For example, the radio transceivers 862 and 866 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 862 and 866 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 866, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 868 may be included to provide a wired communication to the cloud 800 or to other devices, such as the mesh devices 864. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 868 may be included to allow connect to a second network, for example, a NIC 868 providing communications to the cloud over Ethernet, and a second NIC 868 providing communications to other devices over another type of network.

The interconnect 856 may couple the processor 852 to an external interface 870 that is used to connect external devices or subsystems. The external devices may include sensors 872, such as accelerometers, level sensors, flow sensors, optical light sensors, camera sensors, temperature sensors, a global positioning system (GPS) sensors, pressure sensors, barometric pressure sensors, and the like. The external interface 870 further may be used to connect the IoT device 850 to actuators 874, such as power switches, valve actuators, an audible sound generator, a visual warning device, and the like.

In some optional examples, various input/output (I/O) devices may be present within, or connected to, the IoT device 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 850.

A battery 876 may power the IoT device 850, although in examples in which the IoT device 850 is mounted in a fixed location, it may have a power supply coupled to an electrical grid. The battery 876 may be a lithium ion battery, or a metal-air battery, such as a zinc-air battery, an aluminum-air battery, a lithium-air battery, and the like.

A battery monitor/charger 878 may be included in the IoT device 850 to track the state of charge (SoCh) of the battery 876. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 878 may communicate the information on the battery 876 to the processor 852 over the interconnect 856. The battery monitor/charger 878 may also include an analog-to-digital (ADC) convertor that allows the processor 852 to directly monitor the voltage of the battery 876 or the current flow from the battery 876. The battery parameters may be used to determine actions that the IoT device 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the IoT device 850. A wireless battery charging circuit, such as an LTC4020 chip from Linear Technologies of Milpitas, California, among others, may be included in the battery monitor/charger 878. The specific charging circuits chosen depend on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 882 provided via the memory 854, the storage 858, or the processor 852 may be embodied as a non-transitory, machine readable medium 860 including code to direct the processor 852 to perform electronic operations in the IoT device 850. The processor 852 may access the non-transitory, machine readable medium 860 over the interconnect 856. For instance, the non-transitory, machine readable medium 860 may be embodied by devices described for the storage 858 of FIG. 8 or may include specific storage units such as optical disks, flash drives, or any number of other hardware devices. The non-transitory, machine readable medium 860 may include instructions to direct the processor 852 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

EXAMPLES

Illustrative examples of the technologies disclosed herein are provided below. An embodiment of the technologies may include any one or more, and any combination of, the examples described below.

Example 1 includes an internet-of-things (IoT) device for scheduling time-sensitive cyclical network traffic in real-time, the IoT device comprising one or more sensors; one or more processors; and one or more data storage devices having stored therein a plurality of instructions that, when executed by the one or more processors, cause the IoT device to collect, by a sensor of the one or more sensors, sensor data; store the collected sensor data in a data buffer associated with a data storage device of the one or more data storage devices; allocate a packet descriptor for the sensor data; populate the allocated packet descriptor with a header field, a cyclic data port pointer, and a tail field, wherein the cyclic data port pointer indicates a location of the data buffer at which the sensor data has been stored; queue the packet descriptor into a media access control (MAC) unit transmit direct memory access (DMA) of the IoT device; fetch the sensor data from the data buffer based on the cyclic data port pointer; packetize the fetched data, the tail field, and the header field to form a network packet; transmit, based on a launch time, the network packet to a target computing device; update the launch time as a function of a cycle period; and requeue the packet descriptor into the MAC unit transmit DMA.

Example 2 includes the subject matter of Example 1, and wherein to queue the packet descriptor into the MAC unit transmit DMA includes to associate the launch time, a cycle period, and a transmission duration with the packet descriptor.

Example 3 includes the subject matter of any of Examples 1 and 2, and wherein the plurality of instructions further cause the IoT device to allocate a packet scatter buffer for a header field of the network packet and another packet scatter buffer for a tail field of the network packet.

Example 4 includes the subject matter of any of Examples 1-3, and wherein the target computing device is an input/output (I/O) controller.

Example 5 includes the subject matter of any of Examples 1-4, and wherein to requeue the packet descriptor into the MAC unit transmit DMA comprises to requeue the packet descriptor using an interrupt service routine.

Example 6 includes the subject matter of any of Examples 1-5, and wherein to requeue the packet descriptor using an ISR includes to set a priority level associated with the ISR to a highest priority level.

Example 7 includes the subject matter of any of Examples 1-6, and wherein to requeue the packet descriptor into the MAC unit transmit DMA comprises to requeue the packet descriptor automatically using hardware.

Example 8 includes the subject matter of any of Examples 1-7, and wherein to requeue the packet descriptor automatically using hardware comprises to requeue the packet descriptor automatically using hardware subsequent to having updated the tail field.

Example 9 includes the subject matter of any of Examples 1-8, and wherein the plurality of instructions further cause the IoT device to release, in response to a determination that the transmission duration has elapsed, the packet descriptor and the data buffer.

Example 10 includes a method for scheduling time-sensitive cyclical network traffic in real-time, the method comprising collecting, by a sensor of one or more sensors of an internet-of-things (IoT) device, sensor data; storing, by the IoT device, the collected sensor data in a data buffer associated with a data storage device of the one or more data storage devices; allocating, by the IoT device, a packet descriptor for the sensor data; populating, by the IoT device, the allocated packet descriptor with a header field, a cyclic data port pointer, and a tail field, wherein the cyclic data port pointer indicates a location of the data buffer at which the sensor data has been stored; queueing, by the IoT device, the packet descriptor into a media access control (MAC) unit transmit direct memory access (DMA) of the IoT device; fetching, by the IoT device, the sensor data from the data buffer based on the cyclic data port pointer; packetizing, by the IoT device, the fetched data, the tail field, and the header field to form a network packet; transmitting, by the IoT device and based on a launch time, the network packet to a target computing device; updating, by the IoT device, the launch time as a function of a cycle period; and requeueing, by the IoT device, the packet descriptor into the MAC unit transmit DMA.

Example 11 includes the subject matter of Example 10, and wherein queueing the packet descriptor into the MAC unit transmit DMA includes associating the launch time, a cycle period, and a transmission duration with the packet descriptor.

Example 12 includes the subject matter of any of Examples 10 and 11, and further comprising allocating, by the IoT device, a packet scatter buffer for a header field of the network packet and another packet scatter buffer for a tail field of the network packet.

Example 13 includes the subject matter of any of Examples 10-12, and wherein transmitting the network packet to the target computing device comprises transmitting the network packet to an input/output (I/O) controller.

Example 14 includes the subject matter of any of Examples 10-13, and wherein requeueing the packet descriptor into the MAC unit transmit DMA comprises requeueing the packet descriptor using an interrupt service routine.

Example 15 includes the subject matter of any of Examples 10-14, and wherein requeueing the packet descriptor using an ISR includes setting a priority level associated with the ISR to a highest priority level.

Example 16 includes the subject matter of any of Examples 10-15, and wherein requeueing the packet descriptor into the MAC unit transmit DMA comprises requeueing the packet descriptor automatically using hardware.

Example 17 includes the subject matter of any of Examples 10-16, and wherein requeueing the packet descriptor automatically using hardware comprises requeueing the packet descriptor automatically using hardware subsequent to having updated the tail field.

Example 18 includes the subject matter of any of Examples 10-17, and further comprising releasing, by the IoT device and in response to a determination that the transmission duration has elapsed, the packet descriptor and the data buffer.

Example 19 includes one or more machine-readable storage media comprising a plurality of instructions stored thereon that, when executed, cause an internet-of-things (IoT) device to perform the method of any of Examples 10-18.

Example 20 includes an internet-of-things (IoT) device for scheduling time-sensitive cyclical network traffic in real-time, the IoT device comprising: one or more sensors; one or more processors; and one or more memory devices having stored therein a plurality of instructions that, when executed by the one or more processors, cause the IoT device to perform the method of any of Examples 10-18.

Example 21 includes an internet-of-things (IoT) device for scheduling time-sensitive cyclical network traffic in real-time, the IoT device comprising means for performing the method of any of Examples 10-18.

Example 22 includes an internet-of-things (IoT) device for scheduling time-sensitive cyclical network traffic in real-time, the IoT device comprising sensor data collecting circuitry to (i) collect, by a sensor of the one or more sensors, sensor data and (ii) store the collected sensor data in a data buffer associated with a data storage device of the one or more data storage devices; packet descriptor management circuitry to (i) allocate a packet descriptor for the sensor data and (ii) populate the allocated packet descriptor with a header field, a cyclic data port pointer, and a tail field, wherein the cyclic data port pointer indicates a location of the data buffer at which the sensor data has been stored; direct memory access (DMA) interface management circuitry to queue the packet descriptor into a media access control (MAC) unit transmit DMA of the IoT device; data buffer pool management circuitry to fetch the sensor data from the data buffer based on the cyclic data port pointer; and network traffic ingress/egress management circuitry to (i) packetize the fetched data, the tail field, and the header field to form a network packet, (ii) transmit, based on a launch time, the network packet to a target computing device, and (iii) update the launch time as a function of a cycle period, wherein the packet descriptor management circuitry is further to requeue the packet descriptor into the MAC unit transmit DMA.

Example 23 includes the subject matter of Example 22, and wherein to queue the packet descriptor into the MAC unit transmit DMA includes to associate the launch time, a cycle period, and a transmission duration with the packet descriptor.

Example 24 includes the subject matter of any of Examples 22 and 23, and wherein the network traffic ingress/egress management circuitry is further to allocate a packet scatter buffer for a header field of the network packet and another packet scatter buffer for a tail field of the network packet.

Example 25 includes the subject matter of any of Examples 22-24, and wherein the target computing device is an input/output (I/O) controller.

Example 26 includes the subject matter of any of Examples 22-25, and wherein to requeue the packet descriptor into the MAC unit transmit DMA comprises to requeue the packet descriptor using an interrupt service routine.

Example 27 includes the subject matter of any of Examples 22-26, and wherein to requeue the packet descriptor using an ISR includes to set a priority level associated with the ISR to a highest priority level.

Example 28 includes the subject matter of any of Examples 22-27, and wherein to requeue the packet descriptor into the MAC unit transmit DMA comprises to requeue the packet descriptor automatically using hardware.

Example 29 includes the subject matter of any of Examples 22-28, and wherein to requeue the packet descriptor automatically using hardware comprises to requeue the packet descriptor automatically using hardware subsequent to having updated the tail field.

Example 30 includes the subject matter of any of Examples 22-29, and wherein the network traffic ingress/egress management circuitry is further to release, in response to a determination that the transmission duration has elapsed, the packet descriptor, and wherein the data buffer pool management circuitry is configured to release, in response to a determination that the transmission duration has elapsed, the data buffer.

Example 31 includes an internet-of-things (IoT) device for scheduling time-sensitive cyclical network traffic in real-time, the IoT device comprising circuitry for collecting, by a sensor of an internet-of-things (IoT) device, sensor data; circuitry for storing the collected sensor data in a data buffer associated with a data storage device of the one or more data storage devices; circuitry for allocating a packet descriptor for the sensor data; populating the allocated packet descriptor with a header field, a cyclic data port pointer, and a tail field, wherein the cyclic data port pointer indicates a location of the data buffer at which the sensor data has been stored; means for queueing the packet descriptor into a media access control (MAC) unit transmit direct memory access (DMA) of the IoT device; circuitry for fetching the sensor data from the data buffer based on the cyclic data port pointer; circuitry for packetizing the fetched data, the tail field, and the header field to form a network packet; circuitry for transmitting, based on a launch time, the network packet to a target computing device; means for updating the launch time as a function of a cycle period; and means for requeueing the packet descriptor into the MAC unit transmit DMA.

Example 32 includes the subject matter of Example 31, and wherein the means for queueing the packet descriptor into the MAC unit transmit DMA includes means for associating the launch time, a cycle period, and a transmission duration with the packet descriptor.

Example 33 includes the subject matter of any of Examples 31 and 32, and further comprising circuitry for allocating a packet scatter buffer for a header field of the network packet and another packet scatter buffer for a tail field of the network packet.

Example 34 includes the subject matter of any of Examples 31-33, and wherein the circuitry for transmitting the network packet to the target computing device comprises circuitry for transmitting the network packet to an input/output (I/O) controller.

Example 35 includes the subject matter of any of Examples 31-34, and wherein the means for requeueing the packet descriptor into the MAC unit transmit DMA comprises means for requeueing the packet descriptor using an interrupt service routine.

Example 36 includes the subject matter of any of Examples 31-35, and wherein the means for requeueing the packet descriptor using an ISR includes means for setting a priority level associated with the ISR to a highest priority level.

Example 37 includes the subject matter of any of Examples 31-36, and wherein the means for requeueing the packet descriptor into the MAC unit transmit DMA comprises means for requeueing the packet descriptor automatically using hardware.

Example 38 includes the subject matter of any of Examples 31-37, and wherein the means for requeueing the packet descriptor automatically using hardware comprises means for requeueing the packet descriptor automatically using hardware subsequent to having updated the tail field.

Example 39 includes the subject matter of any of Examples 31-38, and further comprising circuitry for releasing, in response to a determination that the transmission duration has elapsed, the packet descriptor and the data buffer.

The invention claimed is:

1. An Internet-of-Things (IoT) device comprising:
   memory including a data buffer, the memory to store first sensor data in the data buffer at a first point in time, and to store second sensor data in the data buffer at a second point in time after the first point in time, the second sensor data including additional sensor data not included in the first sensor data; instructions; and
   processor circuitry to execute the instructions to:
   generate a packet descriptor for sensor data, the packet descriptor to be stored separate from the data buffer, the packet descriptor including a packet header and a pointer, the pointer to indicate a location in the data buffer where the first sensor data is stored, the second sensor data stored at the location in the data buffer identified by the pointer of the packet descriptor;
   generate a first network packet, the first network packet including the first sensor data from the data buffer and the packet header from the packet descriptor;
   cause transmission of the first network packet to a target computing device;
   generate a second network packet, the second network packet including the second sensor data from the data buffer and the packet header from the packet descriptor; and
   cause transmission of the second network packet after the transmission of the first network packet.

2. The IoT device of claim 1, wherein the processor circuitry is to associate a launch time and a cycle period with the packet descriptor, the cycle period to define a period of time from an initial transmission of the first sensor data to a successive transmission of the first sensor data.

3. The IoT device of claim 2, wherein the processor circuitry is to:
   cause the transmission of the first network packet based on the launch time; and
   after the first network packet is transmitted, update the launch time based on the cycle period.

4. An Internet-of-Things (IoT) device comprising:
   memory including a data buffer; instructions; and
   processor circuitry to execute the instructions to:
   generate a packet descriptor for sensor data, the packet descriptor to be stored separate from the data buffer, the packet descriptor including a packet header and a pointer, the pointer to indicate a location in the data buffer where the sensor data is stored;
   generate a network packet, the network packet including the sensor data from the data buffer and the packet header from the packet descriptor, wherein the packet descriptor includes a tail, the network packet includes the tail; and
   allocate separate packet scatter buffers for the packet header and the tail.

5. The IoT device of claim 1, wherein the processor circuitry is to associate a transmission duration with the packet descriptor, the transmission duration to define a duration of time over which the first sensor data is to be transmitted.

6. The IoT device of claim 5, wherein the processor circuitry is to:
   queue the packet descriptor into a media access control (MAC) unit transmit direct memory access (DMA) of the IoT device;
   generate a hardware interrupt to indicate when the first network packet has been transmitted; and
   if the transmission duration has not elapsed since initiation of transmission of the first sensor data, requeue the packet descriptor into the MAC unit transmit DMA.

7. The IoT device of claim 1, wherein the processor circuitry is to cause the packet descriptor to be stored in a transmission descriptor ring.

8. At least one machine readable storage device comprising instructions that, when executed, cause an Internet-of-Things (IoT) device to at least:
   cause first sensor data to be stored in a first memory at a first point in time;
   cause second sensor data to be stored in the first memory at a second point in time after the first point in time, the second sensor data including additional sensor data not included in the first sensor data;
   generate a packet descriptor for the first sensor data, the packet descriptor to be stored in a second memory separate from the first sensor data, the packet descriptor including a packet header and a pointer, the pointer to indicate a location in the first memory where the first sensor data is stored, the second sensor data stored at the location in the first memory identified by the pointer of the packet descriptor;
   generate a first network packet, the first network packet including the first sensor data from the first memory and the packet header from the packet descriptor;
   cause transmission of the first network packet to a target computing device;
   generate a second network packet, the second network packet including the second sensor data from the first memory and the packet header from the packet descriptor; and
   cause transmission of the second network packet after the transmission of the first network packet.

9. The at least one machine readable storage device of claim 8, wherein the instructions cause the IoT device to associate a launch time and a cycle period with the packet descriptor, the cycle period to define a period of time from an initial transmission of the first sensor data to a successive transmission of the first sensor data.

10. The at least one machine readable storage device of claim 9, wherein the instructions cause the IoT device to:
    cause transmission of the first network packet based on the launch time; and
    after the first network packet is transmitted, update the launch time based on the cycle period.

11. At least one machine readable storage device, comprising instructions to cause an Internet-of-Things (IoT) device to at least: cause sensor data to be stored in a first memory;
    generate a packet descriptor for the sensor data, the packet descriptor to be stored in a second memory separate from the sensor data, the packet descriptor including a packet header and a pointer, the pointer to indicate a location in the first memory where the sensor data is stored;

generate a network packet, the network packet including the sensor data from the first memory and the packet header from the packet descriptor, wherein the packet descriptor includes a tail, the network packet includes the tail; and allocate separate packet scatter buffers for the packet header and the tail.

12. The at least one machine readable storage device of claim 8, wherein the instructions cause the IoT device to associate a transmission duration with the packet descriptor, the transmission duration to define a duration of time over which the first sensor data is to be transmitted.

13. The at least one machine readable storage device of claim 12, wherein the instructions cause the IoT device to:

queue the packet descriptor into a media access control (MAC) unit transmit direct memory access (DMA) of the IoT device;

generate a hardware interrupt to indicate when the first network packet has been transmitted; and if the transmission duration has not elapsed since a beginning of transmission of the first network packet, requeue the packet descriptor into the MAC unit transmit DMA.

14. The at least one machine readable storage device of claim 8, wherein the instructions cause the IoT device to store the packet descriptor in a transmission descriptor ring.

15. A method performed by an Internet-of-Things (IoT) device, the method comprising: storing first sensor data in a data buffer at a first point in time;

storing second sensor data in the data buffer at a second point in time after the first point in time, the second sensor data including additional sensor data not included in the first sensor data;

generating a packet descriptor for the first sensor data, the packet descriptor to be stored separate from the data buffer, the packet descriptor including a packet header and a pointer, the pointer to indicate a location in the data buffer where the first sensor data is stored, the second sensor data stored at the location in the data buffer identified by the pointer of the packet descriptor;

generating a first network packet, the first network packet including the first sensor data from the data buffer and the packet header from the packet descriptor; and transmitting the first network packet to a target computing device;

generating a second network packet, the second network packet including the second sensor data from the data buffer and the packet header from the packet descriptor; and transmitting the second network packet after the transmission of the first network packet.

16. The method of claim 15, further including associating a launch time and a cycle period with the packet descriptor, the cycle period to define a period of time from an initial transmission of the first sensor data to a successive transmission of the first sensor data.

17. The method of claim 16, wherein the transmitting of the first network packet is based on the launch time, the method further including, after the first network packet is transmitted, updating the launch time based on the cycle period.

18. The method of claim 15, wherein the packet descriptor includes a tail, the first network packet includes the tail, and the method further includes allocating separate packet scatter buffers for the packet header and the tail.

19. The method of claim 15, further including associating a transmission duration with the packet descriptor, the transmission duration to define a duration of time over which the first sensor data is to be transmitted.

20. The method of claim 19, further including:

queuing the packet descriptor into a media access control (MAC) unit transmit direct memory access (DMA) of the IoT device;

generating a hardware interrupt to indicate when the first network packet has been transmitted; and if the transmission duration has not elapsed since the first sensor data began being transmitted, requeuing the packet descriptor into the MAC unit transmit DMA.

21. The method of claim 15, further including storing the packet descriptor in a transmission descriptor ring.

22. An apparatus comprising:

memory including a data buffer, the memory to store first sensor data in the data buffer at a first point in time, and to store second sensor data in the data buffer at a second point in time after the first point in time, the second sensor data including additional sensor data not included in the first sensor data; instructions; and processor circuitry to execute the instructions to:

generate a packet descriptor for sensor data, the packet descriptor to be stored separate from the data buffer, the packet descriptor including packet header information and a pointer, the pointer to indicate a location in the data buffer where the first sensor data is stored, the second sensor data stored at the location in the data buffer identified by the pointer of the packet descriptor;

generate a first network packet, the first network packet including a packet header and the first sensor data from the data buffer, the packet header including the packet header information;

cause transmission of the first network packet to a target computing device;

generate a second network packet, the second network packet including the second sensor data from the data buffer and the packet header from the packet descriptor; and cause transmission of the second network packet after the transmission of the first network packet.

* * * * *